United States Patent [19]
Keller et al.

[11] 3,943,281
[45] Mar. 9, 1976

[54] MULTIPLE BEAM CRT FOR GENERATING A MULTIPLE RASTER DISPLAY

[75] Inventors: Bruce W. Keller; Michael N. Ernstoff, both of Los Angeles, Calif.

[73] Assignee: Hughes Aircraft Company, Culver City, Calif.

[22] Filed: Mar. 8, 1974

[21] Appl. No.: 412,365

[52] U.S. Cl. .............................. 178/7.5 D; 313/409
[51] Int. Cl.² ............................................. H04N 3/28
[58] Field of Search ..... 178/7.5 D, 7.7, 6.8, DIG. 3; 358/65; 313/411, 413, 409

[56] References Cited
UNITED STATES PATENTS

| | | | |
|---|---|---|---|
| 3,006,989 | 10/1961 | Schröter | 358/60 |
| 3,654,386 | 4/1972 | Baum | 178/7.5 D X |
| 3,798,478 | 3/1974 | Say | 313/411 |

Primary Examiner—Robert L. Griffin
Assistant Examiner—Mitchell Saffian
Attorney, Agent, or Firm—W. H. MacAllister; Rafael A. Cardenas

[57] ABSTRACT

A low bandwidth high brightness display system that utilizes a multiple beam cathode ray tube to write multiple rasters by concurrently scanning a plurality of lines with a selected number of beams. Each of the rasters covers a different portion of the screen so that the vertical deflection of the beam is reduced for each beam by a factor related to the number of beams. The system reduces the maximum data rate in writing speed relative to conventional arrangements with a resultant bandwidth reduction proportional to the number of beams. The concept is applicable to television viewing screens and field sequential color television to produce simultaneously a high resolution, high brightness and high quality display.

10 Claims, 8 Drawing Figures

MULTIPLE BEAM CRT FOR GENERATING A MULTIPLE RASTER DISPLAY

FIELD OF THE INVENTION

This invention generally relates to display systems and particularly to a high bandwidth television display system that operates with individual channels having a relatively small information bandwidth and with a high brightness by utilizing a multi-beam cathode ray tube to form a plurality of adjacent rasters in a first dimension that concurrently define the total display.

DESCRIPTION OF THE PRIOR ART

Television type displays have been unable to develop a high resolution, high brightness and high quality display by using conventional scanning methods of either a single beam or even by using a multi-beam cathode ray tube.

Multi-beam cathode ray tubes (CRT) are well known in the art and have been used for the generation of both color and black and white television displays. Examples of such multi-beam television displays may be found in the following U.S. Pat. Nos. 3,448,316; 3,596,126; 3,546,516; and 3,594,600, all assigned to a common assignee. For example, in 3,448,316 a lens system is used for eliminating optical errors such as spherical aberration and/or coma from the television display. The optical correction is accomplished by the use of a plurality of electron beams which are made to converge substantially at the optical center of a lens-like electrostatic focusing means which is common to all of the beams and focuses beams on to an electron receiving screen. This particular device generates a color diaplay of the sequential color dot type.

Another example of display systems utilizing a multi-beam cathode ray tube may be found in Serial Number 327,896, now U.S. Pat. No. 3,821,796, "Improved Television Display System" which is assigned to the same assignee as this present application. That application discloses a multi-beam cathode ray tube used in conjunction with a field sequential color television system to produce a color display. The electron beams are in line and create a raster by sweeping the plurality of beams across the face of the display in a paintbrush-like fashion. The plurality of electron beams is then used to sweep another series of lines immediately below the previous trace. A transparent rotating color wheel, having the three primary colors — red, green, and blue, is disposed in front of the display for creating the sense of color in the viewer's eye.

The problem with most multi-beam cathode ray tubes is that they must generally be long in length from the viewing screen to the electron gun. The greater length for multi-beam cathode ray tubes is necessitated by the fact that the individual beams must be focused in close proximity to each other and the cathodes must be separated from each other because of the space that each individual cathode requires. Another drawback of most multi-beam CRTs is that generally a high bandwidth is required along with a high deflection rate in the Y-axis. If brightness is to be maintained at a high level a high bandwidth generally results in a poor resolution since brightness is dependent upon a high current beam and higher current results in beam spreading, therefore low resolution. A high current beam further requires higher power, more complex circuitry at greater cost and also reduced reliability.

SUMMARY OF THE INVENTION

Accordingly, it is the object of the present invention to provide a high resolution, high brightness and high quality raster display.

It is another object of the present invention to provide a raster display utilizing a plurality of electron beams having a low bandwidth.

It is another object of the present invention to provide a raster display by a cathode ray tube being shorter in length than heretofore possible.

It is yet another object of the present invention to provide a multi-beam CRT with a small beam deflection in the Y dimension.

It is still another object of the present invention to provide a plurality of electron beams for simultaneously generating a plurality of rasters on a display.

In accordance with the foregoing objects a raster display generation system utilizing a multiple beam CRT includes a display surface, a source for generating a plurality of electron beams and control means. A first electron beam traces a first raster encompassing a first vertical position in a first dimension on the display screen. A second electron beam traces a second raster immediately adjacent to the first raster in a first dimension. A third electron beam traces a third raster immediately adjacent to the second raster in the same dimension. A fourth electron beam traces a fourth raster immediately adjacent to the third raster. The plurality of rasters is created simultaneously by the plurality of electron beams. An individual line of a raster is generated by moving a beam across the face of the screen; the beam is then deflected downward in a second dimension to trace the next line in that raster. Each beam is controled to define an individual raster and the plurality of rasters are generated at the same time, on a line by line basis, by the individual beams.

DETAILED DESCRIPTION OF THE DRAWINGS

Figure 1A:
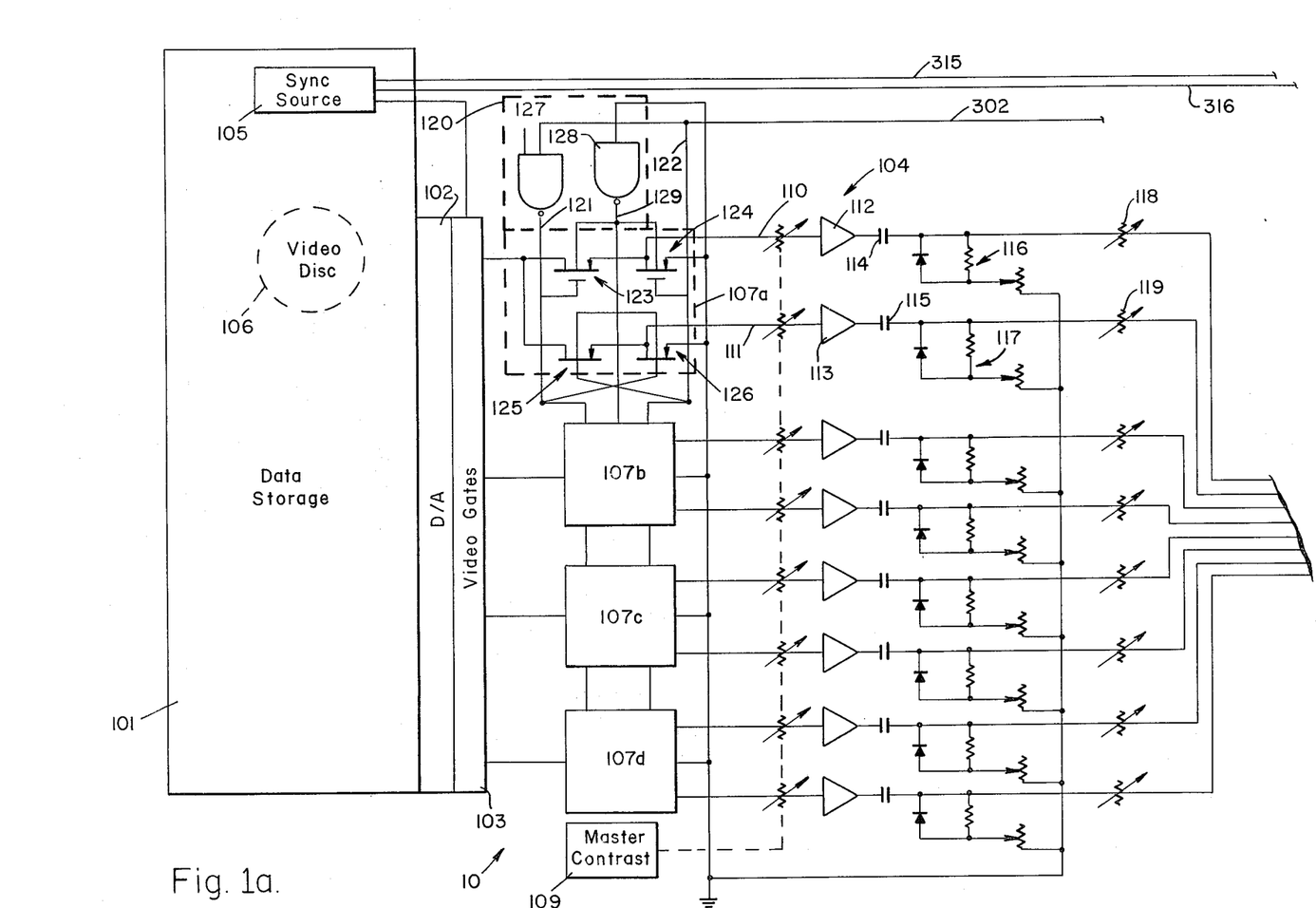
FIGS. 1a and 1b are schematic block and circuit diagrams showing a display system in accordance with the principles of the present invention.
Figure 1B:
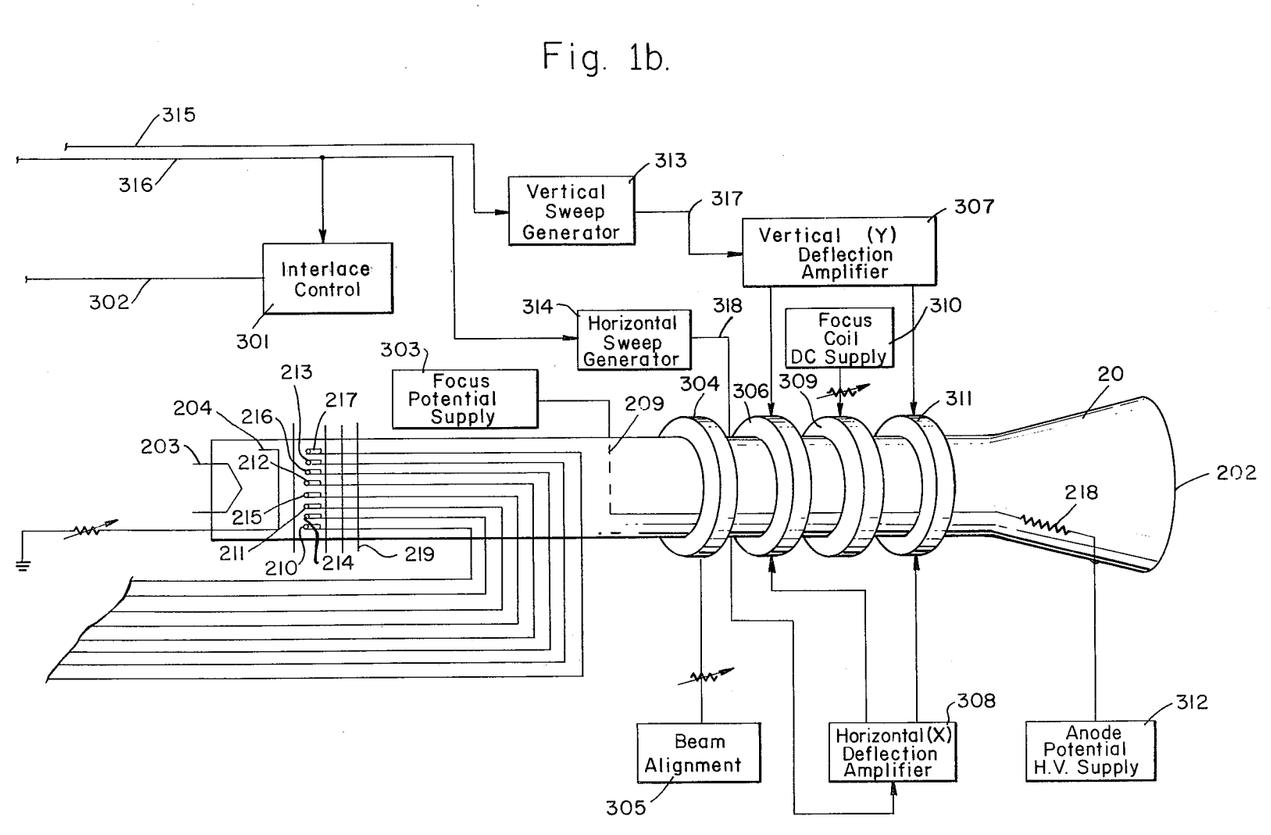

Referring more specifically to FIGS. 1a and 1b, a multiple beam CRT is depicted for simultaneously generating a plurality of rasters on a display. According to the present invention a television display system includes a source of video signals 10, a multiple beam cathode ray tube 20, and controls 30. The source of video signals 10 may be seen to include a data storage unit 101, a digital-to-analog (D/A) converter 102, video gates 103 for controlling the amplitude of the electron beams from an electron gun in the CRT 20 and input circuits 104 to the CRT 10.

The data storage unit 101 which, for example, may be a video disc 106 or any other suitable arrangement such as a magnetic drum, a tape unit, a core memory, a memory using circuits capable of storage or other type of memory for either analog or digital data storage. The data may be provided to the data storage source 101 by a data source such as a vidicon camera for obtaining data from a chart or a scene. A synchronizing unit or source 105 may also be provided in the data storage unit 101 for timing control. When the data storage 101 stores digital information a digital-to-analog (D/A) converter unit 102 must be used to supply analog data to video gates 103 controlled from the synchronizing 105. The video gate 103 supplies a signal to a switch 107A through a lead 108. The switch 107A, in response to the switch control circuit 120, in turn supplies a signal to a suitable master control circuit 109 alternatively through leads 110 or 111. The video gate also supplies signals on the parallel channels of leads 130, 131 and 132 to switches 107B, 107C and 107D, respectively. The first channel of the master contrast circuit 109 provides signals to the video amplifiers 112 or 113 alternatively. The video amplifiers 112 and 113 are followed in turn by AC coupling capacitors 114 and 115, brightness balancing controls 116 and 117 and contrast balancing controls 118 and 119, respectively. It is to be noted that each of the video amplifiers 112 and 113 in the multi-beam arrangement of the invention, require a bandwidth of only one-fourth for the same picture resolution that is required for operation with a single beam since each individual beam is handling only one-fourth of the entire viewing area. Although only the switch 107A has been depicted in detail, switches 107B, C and D and their corresponding circuitry respectively are identical to switch 107A and its associated circuitry.

For interlacing of the beam scanning using an alternate set of beams, a switch control circuit 120 is responsive to the field interlace control circuit 301 to alternatively energize either lead 121 or 122 to connect the input lead 108 through a field effect transistor 123 to the lead 110 or to connect the lead 108 through a field effect transistor 125 to the lead 111. A logical true signal on the lead 302 from the interlace control 301 provides a low voltage on the base of the field effect transistor 123, biasing that transistor into conduction and connecting the lead 108 to the lead 110 and provides a high voltage on the base of the field effect transistor 124, biasing that transistor out of conduction. As the field effect transistor 123 is biased into conduction and the transistor 124 is biased out of conduction so the field effect transistors 125 and 126 are biased out of and into conduction, respectively. A logical false signal on the lead 302 provides a low voltage on the base of the field effect transistor 125 to bias that transistor into conduction and provide a high voltage on the base of the transistor 126 to bias that transistor out of conduction. The signal on the lead 108 is thus applied through the transistor 125 to the lead 111. In the illustrated arrangement, the logical true and false signals on lead 302 may be + 5.0 volts and 0 volts, respectively. An inverter 127 is thus provided between the lead 302 and the lead 121 to provide this conventional switching operation. An inverter 128 is provided to decrease the effect of drift and aging and applies a reference voltage to a lead 129 to control the substrate bias of the transistors.

See the discussion under FIG. 4 below for an embodiment of the present invention wherein a single set of electron beams is used for interlacing purposes.

The multi-beam CRT 20 includes an electron gun section 201 for emitting a plurality of electron beams for painting a picture of display on a phosphorous screen 202. The electron gun 201 may have any of several configurations, such as for example a plurality of cathodes or a singular large cathode having an apertured structure for forming the electron beams. Other schemes may be utilized for forming individual electron beams within the scope of the present invention.

The electron gun 201 as depicted in FIG. 1b includes a heater electrode 203, a cathode electrode 204 having a suitably large area, a baffle 205 having an array of holes that correspond to the required number of beams that are to be formed. The baffle 205 is operated a few volts positive relative to the cathode 204 for forming the individual electron beams. The baffle 205 is followed by a control or matrix grid 206 for the electron beams passing through the grid openings. The grid 206 is an insulated flat plate pierced with an array of apertures identical to those in the baffle 205. The inner surface of the holes in the matrix grid 206 are plated with conductors 210 through 217. The conductors 210–217 are connected in pairs to the switches 107A–107D, respectively. Conductors 210 and 214 are connected to the switch 107A; conductors 211 and 215 are connected to the switch 107B; conductors 212 and 216 are connected to the switch 107C; and conductors 213 and 217 are connected to the switch 107D. The conductors 210–217 may be gated off or on by the switches 107A–107D, respectively. For example, in the system shown, a ground potential applied to the conductors 210–217 will bias the electrons in the ground level or black video level.

Consider for the moment that conductors 210–213 are the only source of electron beams for creating a single field raster. The first conductor 210 is oriented such that the electron beam 210b passing therethrough traces a first line across the screen 202 that is at the very top of display screen 202. The beam 210b is deflected downward and then traces a second line immediately below and ajdacent to the first line. This first beam 210b traces lines across the face of the display until a complete first raster is painted. The complete raster painted by this first beam covers only the upper fourth of the total viewing area.

The second conductor 211 is oriented such that the electron beam 211b passing therethrough traces a first line across the screen 202 that is one-fourth the distance down from the top of the screen. This second electron beam 211b traces a first line across the screen 202 that is adjacent and immediately below the last line of the first raster created by the first beam 210b. The second beam 211b paints a raster on a line-by-line basis until a complete raster is displayed similar to the first raster painted by the first beam 210b. The second raster also covers one-fourth of the viewing area and is immediately adjacent to the first raster.

The third conductor 212 is oriented such that the electron beam 212b passing therethrough traces a first line across the screen 202 that is at the center of the screen 202. This third electron beam 212b traces a first line across the screen 202 that is adjacent and immediately below the last line of the second raster formed by the second beam 211*b*. This third beam 212*b* traces a raster on a line-by-line basis as does the first beam 210*b* and covers one-fourth the total viewing area.

The fourth beam 213*b* formed by the fourth conductor 213 traces a fourth raster, on a line-by-line basis, that is adjacent to and immediately below the third raster and similar to the preceeding rasters. The conductors 210– 213, each trace individual rasters on a line-by-line basis and the four rasters are formed or painted at the same time. The first line of each of the four rasters is painted simultaneously. The second line of each of the four rasters is painted simultaneously. Etc., etc. The group of conductors 210–213 may be used alone, without conductors 214–217, for painting a video display on the screen 202. The present invention is not limited to only four rasters but any other suitable number may be used.

If an interlace scheme is used for painting a complete display on the screen 202, the second set of conductors 214–217 may be used in conjunction with the first group of conductors 210–213. An interlace scheme may also be accomplished by utilizing the circuit of FIG. 4, discussed below, having a single set of 4 electron beams. The first group of conductors 210–213 will paint the first field of a frame and the second group of conductors 214– 217 will paint the second field of that frame or raster. The second group of conductors 214–217 is oriented such that each conductor paints a line immediately below its corresponding counterpart in the first group of conductors 210–213 for painting the second field. Each of the conductors 214–217 function similarly to the conductors 210–213 for painting a set of rasters.

Electrodes 207, 208 and 219 may be provided after the matrix grid 206 in the direction of beam travel for beam shaping and forming. The electrodes 207, 208 and 219 each contain apertures of geometry similar to the baffle and matrix grid electrodes for providing further acceleration to the electron beams.

The electrons from the electron gun 201 are then passed through a focus electrode 209 controlled by a focus potential supply 303 and a beam alignment coil 304, normally situated close to the cathode, controlled by a suitable beam alignment power supply 305. The beam alignment coil 304 is followed by a dynamic focus coil 306 responding to signals from a vertical deflection or Y amplifier 307 and a horizontal or X deflection amplifier 308 to correct for the flatness in the configuration of the screen 202. The electron beams are then passed to a static focus coil 309 controlled by a focus coil DC supply 310. For purposes of illustration, the dynamic focus coil 306 and the static focus coil 309 are shown as being on separate cores. Normally a dynamic focus coil and a static focus coil are wound on the same core. The static focus coil 309 is followed by the deflection yoke or coil 311 having windings responding to the X and Y deflection voltages of the horizontal deflection amplifier 308 and the vertical deflection amplifier 307, respectively. The deflection yoke 311 deflects the plurality of beams passing therethrough by the same amount using the same voltage input. In other words, the beams are simultaneously scanned across the screen in a first dimension and simultaneously deflected in a second dimension by the same voltages. The cathode ray tube may also include a post deflection accelator 218 which is controlled by a high voltage anode potential supply 312 that is referenced to the focus potential supply 303.

The vertical sweep generator 313 and the horizontal sweep generator 314 are coupled to the synchronizing source 105 in the data storage unit 101 through leads 315 and 316, respectively. The field interlace control 301 is coupled to both the synchronizing source 105 and the horizontal sweep generator 314. The interlace control receives the horizontal synchronizing signal on the lead 316 to control interlace switching between the first set of conductors 210–213 and the second set of conductors 214–217 and may include a flip-flop of a conventional type to provide two levels of signals on the lead 301. The vertical sweep generator 313 applies a suitable slow Y sweep voltage through the lead 317 to the vertical deflection amplifier 307 for controlling the vertical deflection of the plurality of beams through the dynamic focus coil 306 and the deflection yoke 311. The horizontal sweep generator 314 applies a relatively fast X sweep voltage through a lead 318 to the horizontal deflection amplifier 308 for controlling the horizontal deflection of the beams.

The operation of the invention according to FIGS. 1a and 1b may be described with reference to such figures. The data storage unit 101 provides digital signals to the digital-to-analog converter 102 which in turn supplies analog signals to the video gates unit 103. The analog signals are then provided by the four channels of the video gates 103 to the switches 107A–107D. Assuming that there is a logical true signal on the lead 302 from the interlace control unit 301, switch 107A will have an output to the amplifier 112 on the lead 110. Similarly, switches 107B–107D will have an output on the lead corresponding to lead 110 of switch 107A. The signal is amplified by the amplifier 112 and the brightness and contrast controls may be used for obtaining a suitably intense electron beam. The signal on line 110 is applied to the conductor 210 for modulating the electron beam 210*b* passing therethrough for painting a first field of a first raster. Similarly, conductors 211, 212 and 213 are simultaneously modulated by their respective leads for painting the first fields of the second, third and fourth rasters respectively. The beam alignment coil 304 positions the beams at the center of the focus coils. The dynamic focus coil 306 and the static focus coil 309 each control the shape of the beam and the spot size on the screen 202. The deflection yoke and the control circuits for that yoke provide the horizontal scanning of the individual electron beams and the vertical deflection of these electron beams. When there is a logical false signal from the interlace control circuit 301 on the lead 302 the switch control 120 switches the output of switch 107A from lead 110 to lead 111 for the conductor 214 to paint the second field of the first raster. The switches 107B–107D are similarly switched at the same time. Conductors 215, 216 and 217 are thus simultaneously switched for providing the second field of the second, third and fourth rasters respectively. The interlace function is thus provided for painting the second field after the first field has been painted.

Figure 2:
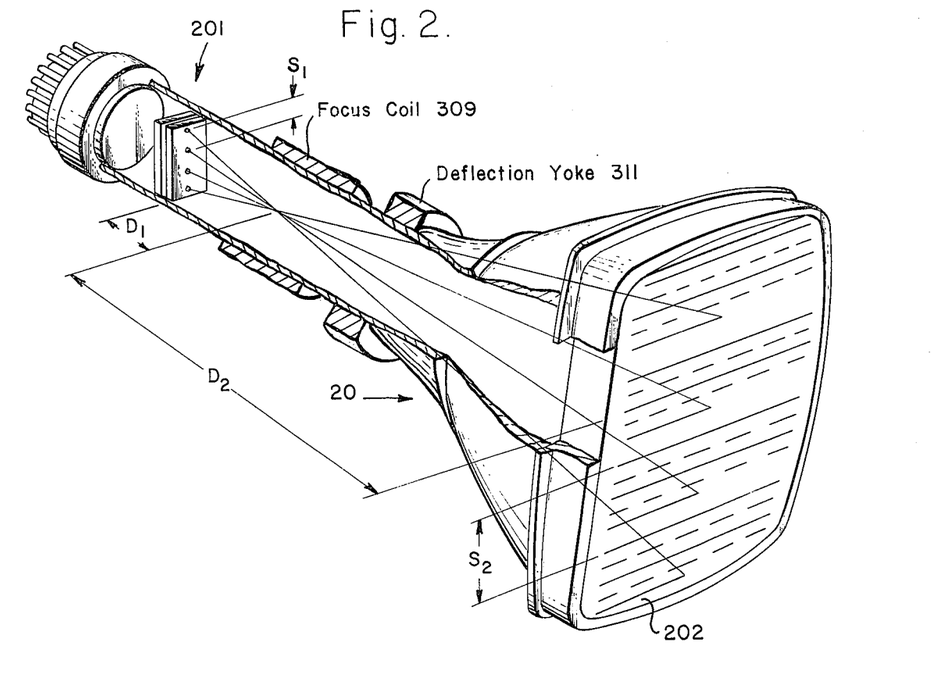
FIG. 2 is a perspective drawing showing a typical multi-beam cathode ray tube that may be utilized in the system of FIGS. 1a and 1b.

With reference to FIG. 2, a multi-beam CRT 20, according to the invention, is depicted, which includes only an electron gun 201, a focus coil 309, a deflection yoke 311, and a screen 202 for purposes of illustration.

It is again noted that the viewing screen 202 is divided into 4 equal portions or rasters along the vertical dimension and each raster is comprised of two fields painted in an alternate fashion by the electron beams emanating from the conductors 210–213 or 214–217. The solid lines across the screen 202 represent the lines of the first field that are painted by the beams 210b–213b emanating from conductors 210–213, respectively. The dashed lines represent the lines of the second field that are painted by the beams 214b–217b emanating from the interlace conductors 214–217, respectively. The four rasters are depicted as being partially complete for purposes of illustration.

One of the features of the present invention is that a multi-beam CRT may be constructed having a shorter length than other available multi-beam CRTs. The spacing between the four beams as displayed on the screen is dependent upon the spacing between the apertures at the electron gun. The beam spacing is defined by the following optical relationship:

$$(D_1/D_2) = (S_1/S_2)$$

where $D_1$ is the distance between the aperture plane and the optical center of the focus coil; and where $D_2$ is the distance between the optical center of a common focus coil and the screen 202. $S_1$ is the spacing between the apertures (conductors 210–213) and $S_2$ is the spacing between corresponding lines painted in corresponding rasters. A common focus is obtained because the focus coil is imaging the aperture on the screen 202.

To demonstrate the size advantage of the present invention, assume for example, that existing multi-beam CRTs have a 1 mm separation between apertures and a 1 mm separation at the viewing screen and that the focus coil must be situated far enough from the apertures so that any possible aberations are eliminated. With a 1 mm separation at both the apertures and the viewing screen the focus coil must be placed at the mid-point between the two. Now consider a 1 mm aperture spacing of the present invention and a 20 mm spacing at the screen 202, where $D_1$ is now 1/20 $D_2$. This means that the focus coil may be placed much closer to the aperture plane than before and aberation is no longer a problem since the beams no longer must be deflected across the entire face of the screen, but only a portion of it or a raster. The focus coil is now merely imaging the apertures on the viewing screen 202.

Another advantage of the present invention is that the beams are now deflected a much smaller angle in the vertical dimension. The vertical deflection of the beam is now 1/N the conventional angle, where N is the number of beams.

The system of the invention is applicable to small, medium and large CRTs. With large CRTs, it would be advantageous to utilize concentric focus and deflection coils to minimize the size of the beam bundle going through the deflection coil.

Figure 3:
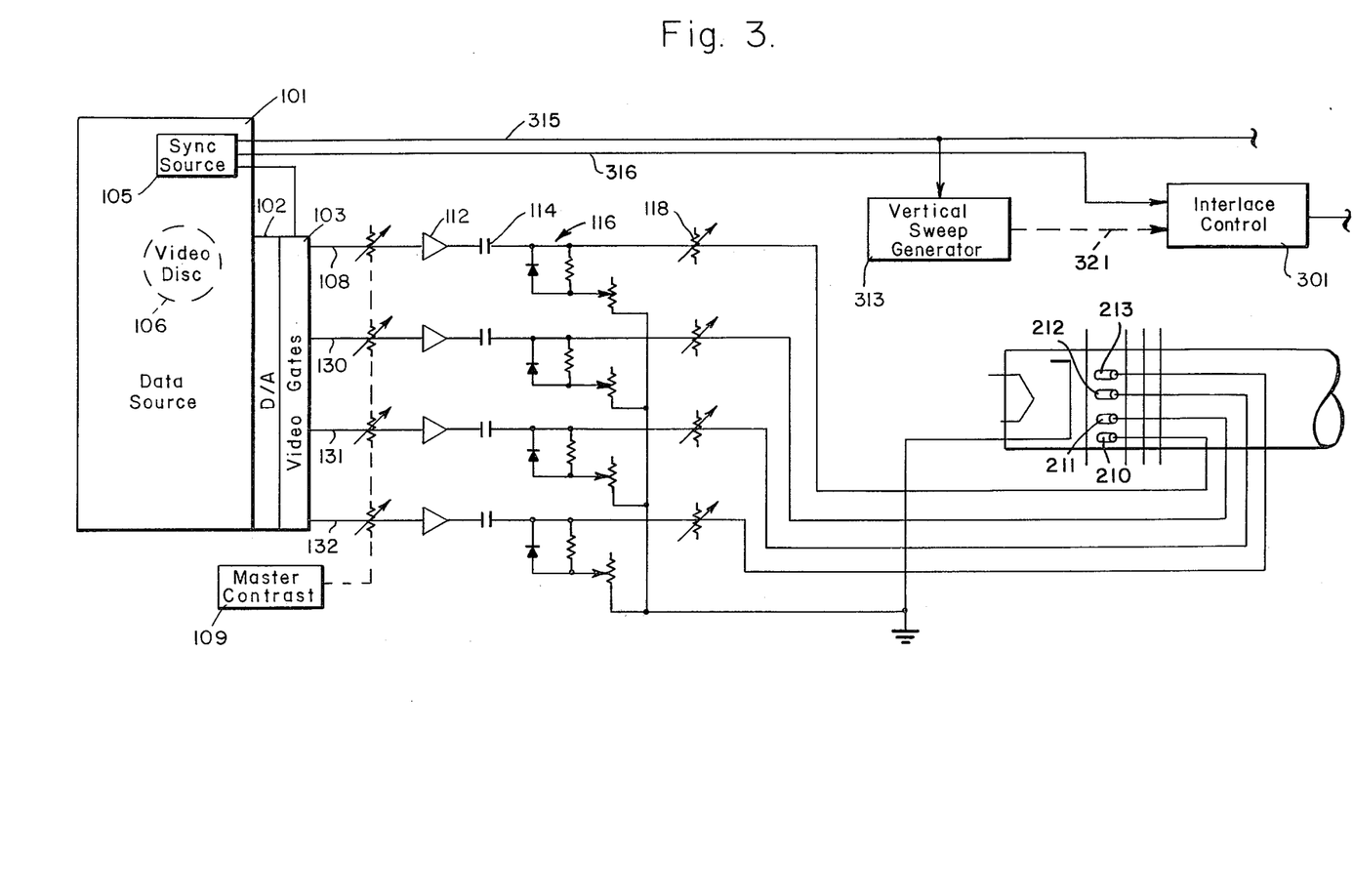
FIG. 3 is a schematic block and circuit diagram showing a display system in accordance with the principles of the present invention.

As mentioned above a four beam device may be used for providing an interlaced function. Such a single four beam device may utilize circuitry as depicted in FIG. 3. The components of FIG. 3 that are similar to the components of FIG. 1 are identified by the same reference designations. It is noted that FIG. 3 is similar to FIG. 1 with the exception that there is no switching arrangement such as circuits 120, and 107A–107D. The video gates 103 now provide an input directly to the master contrast circuits 109 on lead 110. The remainder of the video circuit 104 is identical to the circuit of FIG. 1, including for example, video amplifier 112, coupling capacitor 114, and brightness and contrast controls 116 and 118, respectively. It is noted that the video gate outputs are now coupled to only the four conductors 210–213 in the CRT instead of the conductors 210–217 as in FIGS. 1a and 1b.

It is further noted that only a portion of the CRT of FIG. 1 has been illustrated in FIG. 3. As mentioned above, the embodiment according to FIG. 3 contains only 4 beam sources that operate continually instead of 8 beam sources that operate intermittently. The dashed line 321 connects the interlace control 301 to the vertical sweep generator 313. The interlace control 301 supplies a signal to the vertical deflection amplifier 307 for deflecting the beams from the conductors 210–213 down a one line to provide the interlace function.

The operation of the invention according to the embodiment of FIG. 3, is essentially the same as explained above for FIGS. 1a and 1b with the exception that there is no switching function as provided by circuit 120 and 107A107D. The video gate 103 provides an output to the conductor 210 through the lead 110. The video gates 103 supply outputs on leads 130, 131 and 132 to conductors 211, 212 and 213, respectively. The four conductors 210–213 paint a first field of a 2 field raster or frame in unison. Upon completion of the first field the interlace control 301 supplies the vertical sweep generator with an input signal for deflecting the group of beams 210b–213b down one line and commencing the second field of the two field frame.

Figure 4:
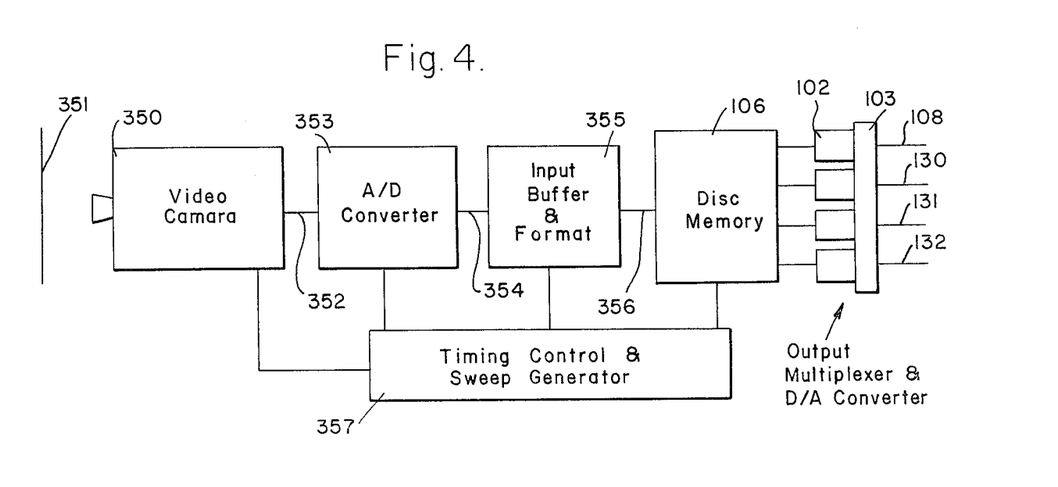
FIG. 4 is a schematic block and partially perspective diagram showing a typical arrangement that may be utilized to provide the stored data in the system of FIGS. 1a and 1b.

Referring now to FIG. 4, a simplified block diagram is shown to illustrate one scheme that may be utilized to provide the data for a multi-beam display in accordance with the invention. In the illustrated arrangement a camera 350 may view a scene indicated by a line 351 which may be a chart or desired area. The video signal developed by the camera 350 which may be any conventional type of camera, is applied through a suitable lead 352 to an A to D converter 353 and then in digital form through a composite lead 354 to an input buffer and format logic unit 355. The data sequencing provided by the circuit 355 depends upon the type of format used, that is, the number of beams and whether or not it is interlaced on the final picture. The buffer unit is properly timed to place the data in proper position so that when it is applied on a composite lead 356 to the disc memory 106, it is stored in the proper positions for being read out in parallel on the proper leads and in a correct sequence. A timing control and sweep generator unit 357 controls each of the units so that the data is properly stored in the memory 106. It is to be noted that this storage of the data is not necessarily in real time and very slow scan camera operation may be utilized. Upon completion of data storage in the disc memory 106, the digital data may be passed through the output multiplexer and the digital-to-analog converter unit 102. The D/A unit 102 provides signals to the video gates unit 103 then to the leads 108 and 130–132 connected to the input circuits of FIGS. 1 and 3.

Figure 5A:
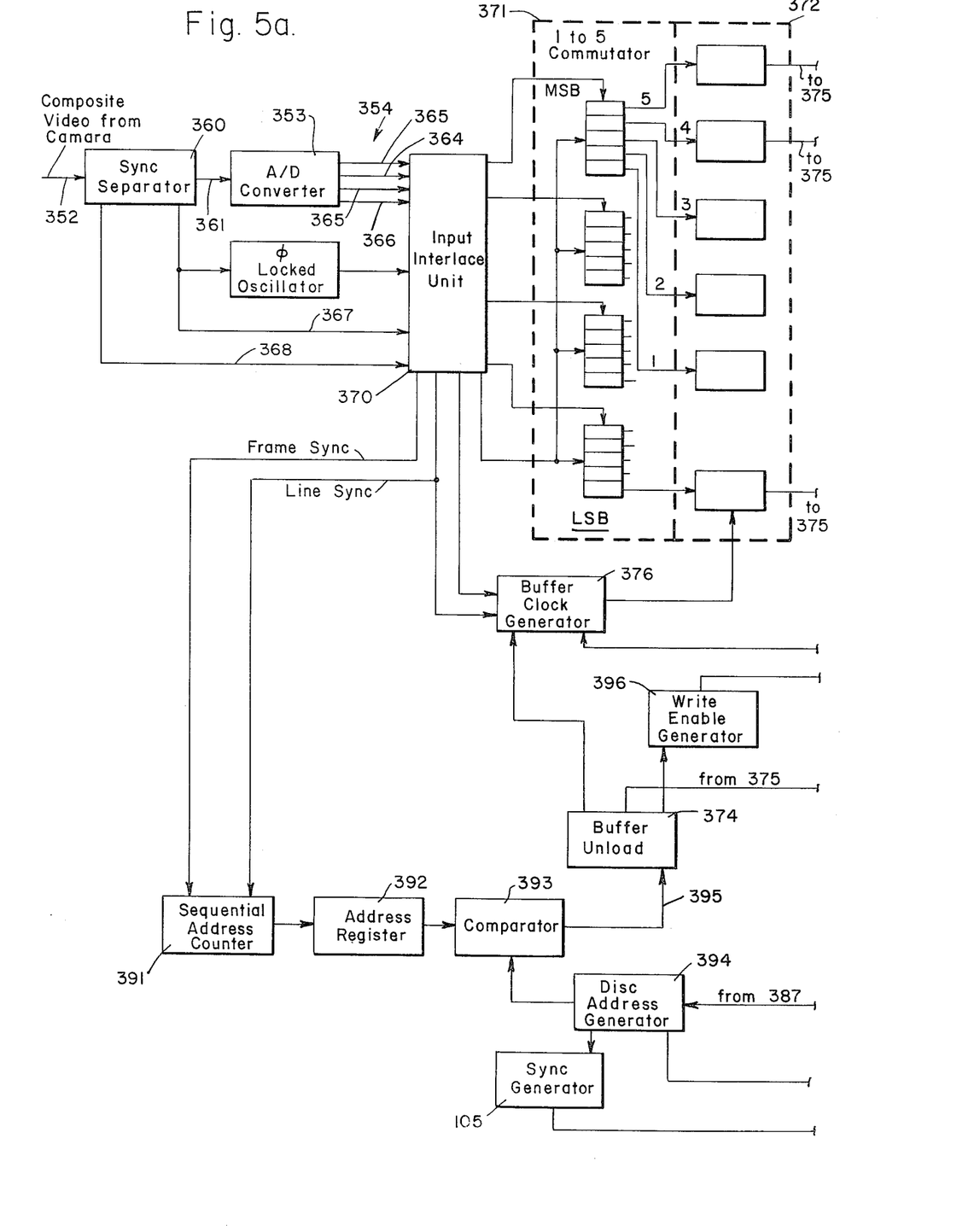
FIGS. 5a and 5b are a schematic block diagram of a digital scan converter that may be utilized in the system of the invention to provide the video data.
Figure 5B:
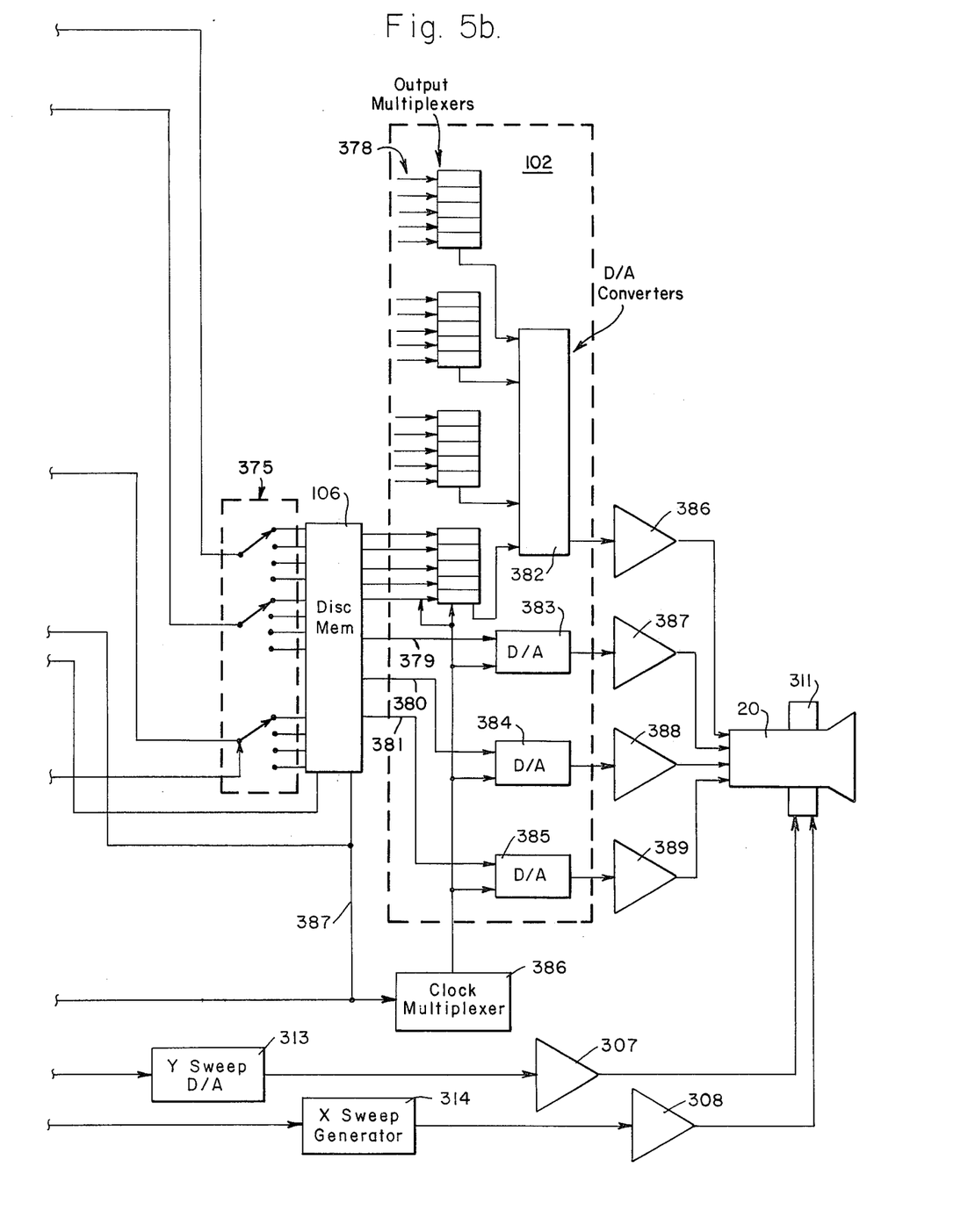

Referring now to FIGS. 4, 5a, and 5b, a more detailed example is given using a circuit that converts a standard single channel video output signal into 4 parallel video channel signals wherein each channel paints a raster on a display screen on a line-by-line basis in accordance with the invention. Since four beams are simultaneously generating a display, a system must be utilized that provides four parallel video channels outputs from a standard single channel input.

Composite video from the camera 350 (FIG. 4) is received on the lead 352 and is applied to the synchronizing signal separator 360 which may be of a conventional type including clipping circuits and which applies the video signal on a composite lead 361 to analog-to-digital (A/D) converter 353 which in turn provides 4 bits of video data on leads 363 to 366 (composit lead 354). The synchronization signal separator applies a horizontal synchronizing signal to a lead 367 and a vertical synchronizing signal to a lead 368 with the horizontal synchronizing signal applied to a phase-lock oscillator 369, to develop an element synchronizing signal equal to the number of displayed elements per line such as 1,500. The 4 bit video signal which represents a signal display element or a portion such as 1/1500 of a line and synchronizing signals are applied to an interface electronics unit 370 which provide suitable amplification and impedance matching. The digital video signal is applied from the interface unit 370 on 4 leads to a 1 to 5 commutator 371 which may include 4 registers or shift registers, each having 5 flip-flops and each register receiving a different significant bit of the video number. The output of the commutator 371 on 20 leads is applied to an input buffer unit 372 which includes 20 registers with 300 flip-flops per register so that the stored output therefrom on 20 lines is one display raster line. A beam select logic or gate unit gates the video data through 20 to 80 leads to a disc memory 106 in response to a buffer unload control logic unit 374 responding to a comparison of the input address and the disc memory address. All of a line is transferred through the first switch position of the twenty switches of the logic unit 375 followed by a change of switch positions to transfer the next line into the disc. Thus, four lines are stored for parallel readout. The input line buffer unit 372 also receives the buffer clock signal from a clock 376, which in turn responds to a shift or comparison signal from the control logic unit 374. When the buffer clock generator 376 which is a three position switch is enabled by the line sync signal, the element sync signal is applied to the shift registers to transfer bits therein and when the clock generator is enabled by an address comparison, the disc clock is applied to the buffers to transfer the bits to the beam select unit 375. In the illustrated arrangement, the beam select logic unit 375 may include 20 continually rotating switches so that the data of four display lines is positioned at four tracks of the disc memory 106, each track corresponding to a separate raster. The next four lines being placed in the same four disc tracks (each line may occupy 20 parallel tracks). The disc memory 106 which may include 80 tracks applies the video on four composite leads 378 to 381, each of 20 lines, to respective output multiplexers and D to A converter units 382 to 385 which are responsible to the high speed multiplexer clock 386 receiving disc clock signals from a lead 387 as derived from the disc memory 106. The four shift registers receiving the video signals for one line on the first lead 378 are shown in detail with the four bits of a line being loaded at a first pulse rate in response to 300 clocks and transferred to the D/A converter at a second pulse rate in response to 1,500 pulses, for example. Each of the composite leads 378 to 381 passes a line of data, five elements at a time. In other words, the illustrated arrangement transfers five elements into the disc memory at one time and transfers five elements at a time out of the disc memory. The analog video is then applied from the D/A converter units 382 to 385 through the video gates unit 103 (not shown) and then through the respective video amplifiers 386 to 389 and in turn through suitable leads to the electron gun control electrodes in an illustrated 4 beam cathode ray tube 20. The output multiplexers and the D to A converters of FIG. 5b correspond to the D/A converter 102 of FIG. 1a. The video amplifier units 386 to 389 of FIG. 5b correspond to the video amplifiers shown in FIG. 1a.

For interlacing with an 8 beam tube, the interlace switches 107A to 107D of FIG. 1 may be utilized.

For providing the proper address for data to be written or recorded into the disc memory 106, a sequential address counter 391 receives frame sync and line sync signals to apply address values to a storage unit 392 which is in turn applied to a comparator unit 393. In response to the disc clock on the lead 387, a disc address generator 394 develops a disc address which is applied to the comparator 393 to develop a write enable pulse when the input video line address compares with the address, which pulse is applied through a lead 395 as a compare pulse to the buffer unload control logic unit 374. The clock generator 376 includes a switch that is enabled to apply a disc clock pulse to the buffers during readout into the disc. Also, the compare pulse is applied to a write enable generator unit 396 to enable the disc memory 106.

The disc address generator unit 394 also applies an address to a synchronizing generator 105 to apply a signal to an X sweep generator 314. The disc address is further used in a Y sweep D to A unit to convert the address to a Y sweep signal. The X and y sweep signals are applied through suitable deflection amplifiers 307 and 308 to the cathode ray tube 20 deflection yoke 311 as previously explained.

Figure 6:
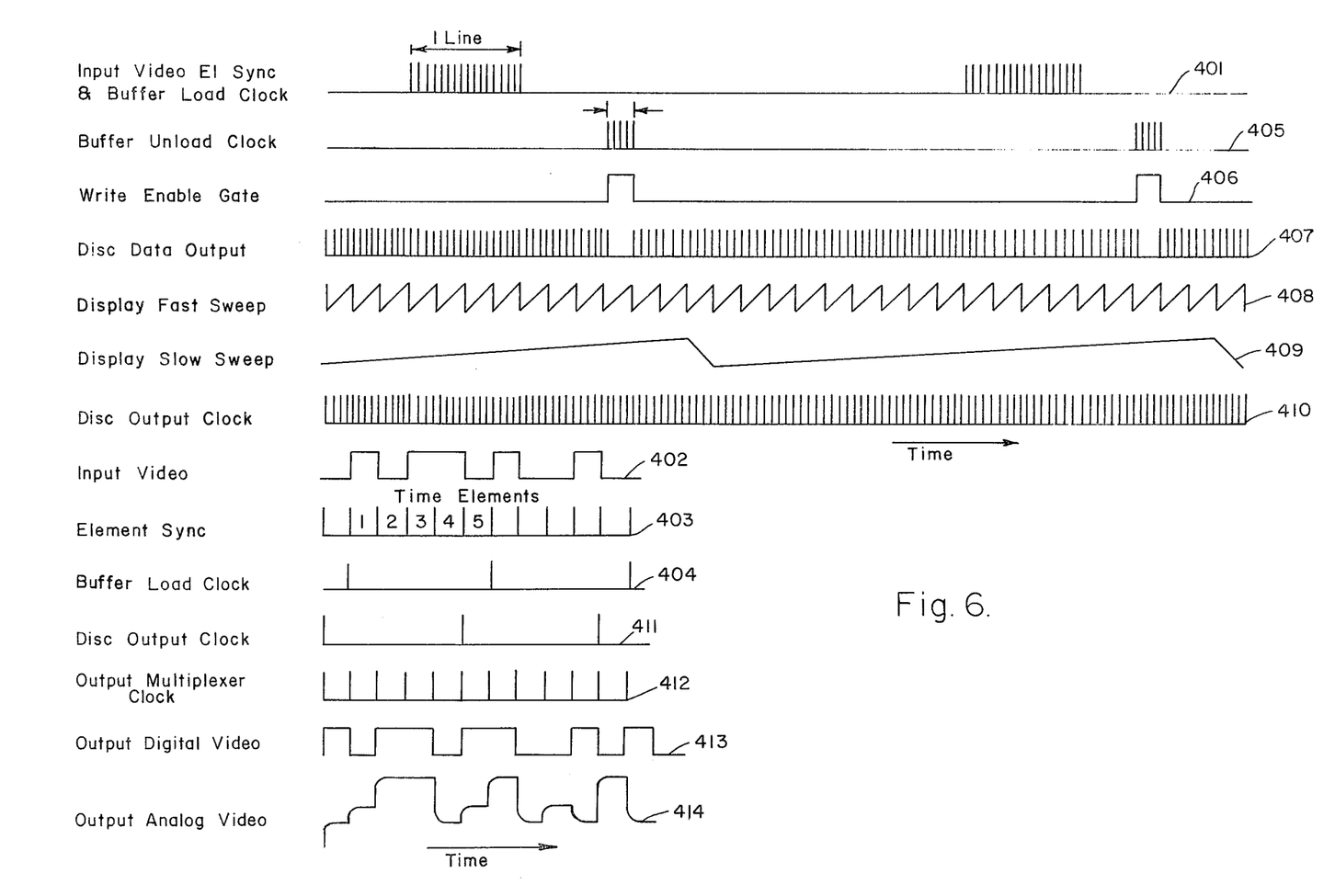
FIG. 6 is a schematic diagram of waveforms of voltage as a function of time for further explaining the operation of the scan converter of FIGS. 5a and 5b.

The input single channel video including the element synchronizing signal on the lead 352 is shown in FIG. 6 by a waveform 401 as bursts of video, each representing a single line of video data. A portion of the input video on a different time scale is indicated by a waveform 402, and occurs on the leads at the output of the interface unit 370. The element sync signal on the lead at the output of the phase locked oscillator 369, which shifts data into the commutator 371, which may be considered a relatively slow signal is shown by a waveform 403, and a buffer load clock signal from the clock generator 376 shown by waveform 404 as even a slower rate pulse for shifting the data out of the input line buffers. The buffer unload clock which transfers data to the disc memory is shown by a waveform 405 and provides a signal for each line period. In response to the write enable generator 396 a write enable gate of a waveform 406 enables the writing of the video into the disc memory 377. The disc data output as shown by waveform 407 and which represents the signal on the composite leads 378 to 381 is continuous except during the period of the write enable gate of the waveform 406. Thus, the disc memory is operated at the speed desired for the readout. The display fast sweep is shown by waveform 408 and the display slow sweep signal is illustrated by the waveform 409. The disc output clock which operates is a relatively fast rate is illustrated by waveform 410 and is shown in more detail on a separate time scale as the clock of a waveform 411 which appears on the lead 387 and is utilized for loading the shift registers of the units 382 to 385. The output multiplexer clock for unloading the multiplexer shift registers is shown as a waveform 412 pulsing at a relatively high speed. The output digital video of a waveform 413 is applied to the D to A units to provide an output analog video of a waveform 414 at the input leads of the video amplifiers. As an illustrative example, the element sync signal of the waveform 403 may operate between 50 and 500 Kilohertz depending on the input data rate, the output clock of the waveform 411 may operate at 3 MHz and the output multiplexer clock of the waveform 412 may operate at 15 MHz.

Thus, FIGS. 4, 5a and 5b illustrate a multi-beam scan convertor for converting a standard single channel video output signal into 4 parallel video channels as required for the display. The purpose for the 1 to 5 commutator is to reduce the video rates to one-fifth their normal values so that the data rates are compatible with the disc storage system. After the 1 to 5 commutation each of the 5 lines are split into 4 separate parallel channels corresponding to the four beams of the CRT for a total of 20 channels per intensity code level. These 20 channels are then recombined back into the basic 4, as required to drive the display. In recombining the channels the video data rate is multiplied by 5. It has been noted that the principles of the invention are not to be limited to any particular serial parallel converter but that any suitable arrangement or source of parallel video data may be utilized.

It should be apparent from the foregoing that the present invention provides a high brightness and high resolution display system. Heretofore, single beam display systems required broadband video and deflection circuits which resulted in lower quality raster displays, such as for example, poor brightness and resolution. The present invention provides a broadband operation by utilizing a pluraltiy of narrow band channels for simultaneously generating a plurality of rasters.

Although the present invention has been shown and described with reference to particular embodiments, nevertheless, various changes and modifications obvious to one skilled in the art to which the invention pertains are deemed to be within the purview of the invention.

What is claimed is:

1. A system for producing a broadband television type display having a selected number of sweep lines comprising:
   a source of video data for presenting a single image having a plurality of rasters;
   a cathode ray tube having a single electron gun, a screen and a plurality of electrodes for producing a plurality of beams, each electrode being positioned relative to said screen and relative to said other electrodes to define a separate raster area on said screen, each of said rasters define an individual area of said image, all of said rasters defining said image;
   means coupling said source of video data to said plurality of electrodes for supplying each of said electrodes with parallel video signals representing individual areas of said image;
   scanning means coupled to said cathode ray tube for controlling said plurality of beams to simultaneously scan across said screen in a first dimension;
   deflecting means coupled to said cathode ray tube for simultaneously deflecting said beams in a second dimension; and
   said scanning means and said deflecting means developing predetermined magnetic fields to control said beams to cause each of said plurality of beams to move across said screen in said first and second dimensions to form a plurality of lines on said screen in a different raster area, each plurality of lines defining a different raster and occupying a separate portion of said screen with said plurality of rasters producing a unified picture display.

2. A system for producing a broadband television type display according to claim 1 wherein said source of video data comprises:
   digital data storage means for storing video data for presenting in said plurality of rasters, said digital data storage means for simultaneously reading out selected video data for simultaneous display of said plurality of rasters.

3. A system for providing a broadband television type display according to claim 1 wherein each raster is comprised of first and second fields and wherein:
   said deflecting means develops a magnetic field to control said plurality of beams for each beam to scan a first field on said screen by tracing a first set of alternate lines on said screen and to control said plurality of beams for scanning a second field on said screen by tracing a second set of alternate lines on said screen.

4. A system for providing a broadband television type display according to claim 1 wherein said plurality of electrodes will each produce a first plurality of beams and said cathode ray tube further comprises:
   a second plurality of electrodes, each for producing a second plurality of beams, each of said first plurality of beams for scanning a first plurality of rasters for representing a first field and each of said second plurality of beams for scanning a second plurality of rasters for representing a second field.

5. A system for providing a broadband television type display having a selected number of sweep lines comprising:
   a source of N parallel video signals representing an image;
   a cathode ray tube having an information retentive screen for writing a frame of data thereon having an electron gun providing N electron beams, said electron gun being positioned relative to said screen and having control electrodes positioned relative to each other so that said N beams define raster areas, said N equal raster areas define said image, each of said N rasters being at a different one of N positions on said screen and each of said N rasters being simultaneously formed on a line-by-line basis;
   means coupling said source of data to said cathode ray tube for controlling said electron beams and for providing said N parallel video signals to said electron beams;
   scanning means for simultaneously scanning said N beams across said screen in a first dimension; and
   deflecting means for simultaneously deflecting said N beams in a second dimension for forming N rasters on a line-by-line basis.

6. A system for producing a broadband television type display according to claim 5 wherein said source of video data, comprises:
   digital data storage means for storing video data for presenting in said N rasters, said digital data storage means for simultaneously reading out selected video data for simultaneous display of said N rasters.

7. The invention according to claim 5, wherein each raster is comprised of first and second fields and wherein:

each of said N beams are controlled by said deflecting means for scanning said first field of each raster by tracing a first set of alternate lines on said screen, and for scanning said second field of each raster by tracing a second set of alternate lines on said screen.

8. A system for providing a broadband television type display according to claim 5 wherein said control electrodes are for controlling a first set of N beams and said cathode ray tube further comprises:
a second set of control electrodes for controlling a second set of N beams, said first set of N beams being for scanning a first field for said N beams being for scanning a first field for said N rasters, and said second set of N beams being for scanning a second field, for said N rasters.

9. The invention according to claim 5 wherein said source of video data comprises:
N parallel video channels for providing said N beams with N narrow band signals.

10. A system for providing a broadband television type display having a selected number of sweep lines for displaying a single image, comprising:
a cathode ray tube having an information retentive screen for writing a frame of data thereon having a single electron gun providing N electron beams, said electron gun being positioned relative to said screen so that N beams define N equal raster areas raster with each raster at a different one of N positions on said screen and so that each of said N rasters may be formed on a line-by-line basis to define a separate raster area, said N equal raster areas define said image;
scanning means coupled to said cathode ray tube for simultaneously scanning said N beams across said screen in a first dimension for developing said N rasters; and
deflecting means coupled to said cathode ray tube for simultaneously deflecting said N beams in a second dimension for developing said N rasters.

* * * * *